United States Patent Office 3,472,749
Patented Oct. 14, 1969

3,472,749
PHOTOCHEMICAL PROCESS FOR THE PRODUCTION OF TRICYCLO-DECENE TETRACARBOXYLIC ACID ANHYDRIDE
Jerald S. Bradshaw, Richmond, Calif., assignor to Chevron Research Company, San Francisco, Calif., a corporation of Delaware
No Drawing. Original application Oct. 12, 1965, Ser. No. 495,345. Divided and this application Dec. 21, 1967, Ser. No. 705,584
Int. Cl. B01j 1/10
U.S. Cl. 204—162                          8 Claims

ABSTRACT OF THE DISCLOSURE

Process for the production of tricyclo[4.2.2.0$^{2.5}$]-9-R-dec-9-ene-3,4,7,8, tetracarboxylic acid dianhydride from the radiant energy catalyzed reaction of maleic anhydride and an aryl hydrocarbon of the formula $C_6$—$C_5R$ effected in the presence of a lower dialkyl ketone.

---

This application is a divisional of copending application Ser. No. 495,345, filed Oct. 12, 1965.

This invention relates to an improved process for the formation of benzene-maleic anhydride adducts.

It is known that maleic anhydride reacts with benzene or mono-substituted benzenes under the influence of actinic light. It is also known that added aryl ketones make an otherwise impracticable reaction appreciably better in terms of rate and conversions. On the other hand, the reaction suffers from substantial disadvantages despite the presence of the added ketone. Among these is the strong adherence of the odorous aryl ketones to the desired adduct and of the equally odorous photo-induced aryl ketone fragmentation products. Another is the consumption of costly aromatic ketones in the process.

It has now been found that an actinic light induced reaction of maleic anhydride with benzene hydrocarbons of the formula $C_6H_5R$ in which R is hydrogen or a saturated hydrocarbon radical having fewer than about 21 carbon atoms can be readily and satisfactorily carried out by irradiating a liquid mixture of the anhydride, the desired hydrocarbon and a lower dialkyl ketone provided that for each mol of maleic anhydride at least, and preferably more than, two mols of the lower dialkyl ketone is present in the reaction mixture. Other reaction conditions include temperatures and pressures sufficient to maintain the liquid reaction mixture. The temperature should be reasonably less than the pyrolysis temperatures of the reactants, i.e., about 5 to 10° C. less. Under the above conditions, maleic anhydride adducts to benzene and mono-substituted benzenes at a good rate and in high yield thereby producing tricyclo-compounds of the formula

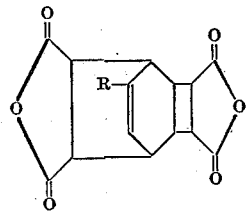

in which R is hydrogen or a saturated hydrocarbon radical as noted above. In general these reaction products are colorless, odorless crystalline materials.

By a lower dialkyl ketone is meant ketones of the formula RCOR in which R is an alkyl group containing fewer than 7 carbon atoms and can be the same or different.

In a preferred embodiment of the present process a solution of maleic anhydride, ethylbenzene and acetone in a weight ratio, respectively, of 10, 47, and 43 is irradiated with actinic light, for example by a mercury arc lamp. After about an 11-hour reaction period under ambient temperature and pressure conditions about 83 percent of the anhydride is found to have reacted. The acetone remaining in the reaction product mixture is removed by distillation leaving a solid, somewhat tacky, crystalline product. It is separated from the excess ethylbenzene by filtration and the collected solid washed several times with dry ethyl ether. For most purposes it is sufficiently pure for use without further purification.

Variations in temperature and pressure in the present process have little, if any, effect upon the reaction rate. Therefore, it is most conveniently carried out under ambient conditions of temperature and pressure. The product is more soluble in the reaction mixture, in general, at higher temperatures and thus where the use of elevated temperatures is desirable, a pressure at least sufficient to maintain the liquid reaction phase is required. In general a reaction temperature above 250° C. is undesirable.

Ordinary actinic light in general is useful for the initiation of the present adduction reaction. In particular, at least an appreciable amount, for example, at least 1% thereof, should be in the wavelength range below about 4000 A. As the fraction of the light in the 2000–4000 A. wavelength region is increased, the relative efficiency of this process is increased. Light from a mercury arc source, or the like, is therefore particularly effective. On the other hand, for reasons of cost, sunlight is a desirable source of the activating energy for this process; although, of course, when sunlight is used and because of relative intensity factors, the reaction times will be longer.

When at least two mols of lower dialkyl ketone per mol of maleic anhydride is present, some enhancement of the reaction is experienced. In general, however, for a satisfactory rate and degree of conversion, at least 4 mols of acetone should be present. Preferred relative amounts are in the range from about 5–20 to 1, respectively. Larger ratios can be used and in some circumstances may be desirable except that in general at these higher ratios, the resulting dilution of the reactants may adversely affect the relative rate of the reaction in the usual sense.

In the course of the present reaction, 2 molecules of maleic anhydride add to one molecule of the aryl hydrocarbon. Stoichiometrically, a 2 to 1 mol ratio, respectively, is indicated. In general, however, an excess of the hydrocarbon relative to the anhydride is desirable. The addition of the second molecule of anhydride to the hydrocarbon appears to be so much faster than that of the first adduction that the mono-adduct is not detectable by ordinary means in the product mixture. The excess hydrocarbon therefore is useful for the maintenance of the required liquid reaction system in general. As in the case of the added dialkyl ketone, if the amount of the hydrocarbon becomes too excessive, dilution factors detract from the utility of the system. Relative ratios of aryl hydrocarbon to maleic anhydride in the range 0.1–20 to 1, respectively, are in general satisfactory.

Lower alkyl ketones in general are useful in this process. Acetone is preferred for reasons of practicality. Other representative ketones useful in the process are 2-pentanone, 2-butanone, 6-methyl-3-heptanone, 2-methyl-3-pentanone, 3-hexanone and the like dialkyl ketones.

Among the hydrocarbons contemplated for use in this is benzene and such representative hydrocarbons as toluene, t-butylbenzene, 2-phenylhexane, 1-phenyl-5-t-butyl-hendecane, cyclododecylbenzene, 4-phenylhexadecane, 1-phenyleicosane, cyclohexylbenzene, $C_{9-15}$ polypropylbenzene, cyclooctylbenzene, ethylbenzene, cumene, s-butylbenzene, 1-phenyl-dodecane, 2-phenyl-heptane, 3-phenyldecane and the like mono-substituted benzene hydrocarbons in which the substituent group is a saturated hydrocarbon radical. Alkylbenzenes having fewer than 21 carbon atoms per alkyl group are preferred.

The $C_{7-20}$, inclusive, mono-alkylbenzenes are particularly useful and desirable because the resulting tricyclo-9-$C_{7-20}$ alkyl-dec-9-ene tetracarboxylic acid anhydrides appear to have only moderately elevated melting points. They lend themselves reasonably conveniently to the production of polyimide polymers and the like.

The following examples illustrate the invention.

EXAMPLES 1-3

Solutions of ethylbenzene and maleic anhydride or the foregoing plus acetone were placed in a quartz reaction vessel and irradiated with a 450-watt Hanovia mercury arc (2000-4000 A.) lamp. A large excess of ethylbenzene was present in each run. In these runs tricyclo-[4.2.0$^{2.5}$]-9-ethyl-dec-9-ene-3,4,7,8 tetracarboxylic acid dianhydride was formed. The extent of the reaction at various times was determined by vapor phase chromatographic analysis of aliquots of the reaction mixture as listed in Table I.

TABLE I

| Mol Ratio Acetone: MA:[1] | Percent MA Reacted Time, Hrs. | | |
|---|---|---|---|
| | 4 | 8 | 11 |
| 0 | 21 | 28 | |
| 1 | 29 | 36 | 39 |
| 7 | 36 | 72 | [2]83 |

[1] Maleic anhydride.
[2] 63% yield of desired tricyclo-product recovered.

The above runs demonstrate that the presence of a substantial molar excess of a lower dialkyl ketone over maleic anhydride in a maleic anhydride-alkylbenzene photolytic adduction reaction mixture markedly improves rates and conversions therein.

EXAMPLE 4

When a minor amount of an aryl ketone such as benzophenone is added to an acetone promoted reaction mixture as above, i.e., acetone to maleic anhydride ratio of 7.6 to 1, respectively, and 0.2 mol benzophenone added per mol of the anhydride, a small additional conversion advantage was experienced. Thus after 8 hours, 74 percent of the anhydride had reacted as compared to 72 percent (see above) where no aryl ketone was added.

Comparable results are found when acetophenone is substituted for the above aryl ketone.

EXAMPLES 5-10

In experiments analogous to the above examples and using acetone promoter, the dianhydride maleic adducts were prepared in good yields from benzene, toluene, cumene, t-butylbenzene, $C_5$-$C_6$ cracked wax olefin benzene alkylate, and $C_{10}$-$C_{13}$ straight chain alkylbenzene.

The tricyclo-decene dianhydrides obtained from the above alkylbenzenes were characterized by determination of equivalent weights of the dianhydrides, of their tetracarboxylic acid hydrolysis products, and of the carbon and hydrogen contents for the methyl ester derivatives. All of the experimental values approximated within acceptable limits the theoretical values. The infrared spectra of the dianhydrides obtained from the alkylbenzenes were the same in all the essential details, except, of course, for differences in the 1400-1500 cm.$^{-1}$ region which correspond to differences in the alkyl group. A representative spectra (figure) for the cumene adduct is attached. Finally, the nuclear magnetic resonance spectra of the tetramethyl ester derivatives of the dianhydrides established that they contain but a single vinyl proton ($\delta$ 6.2). Thus the alkyl substituent group is in the vinyl position.

Polyimides from 9-alkyl-tricyclodecene-9 dianhydrides

The alkyl substituted dianhydrides of this process are useful for the production of tough high melting polyimides. While the dianhydride obtained from benzene has an extremely high melting point and is thus somewhat difficult to use in a polymerization, the alkyl substituted analogues have substantially lower melting points (Table II) and thus can be used in a polymerization in conjuntion with a suitable diamine to produce imide polymers.

TABLE II

| Alkylsubstituent: | Melting point, ° C. |
|---|---|
| None (i.e., benzene) | 350 |
| Methyl | 265-270 |
| Ethyl | 250-255 |
| Cumene | 250-255 |
| t-Butyl | 245-250 |
| $C_5$-$C_6$ Mixture | ([1]) |
| $C_{10}$-$C_{13}$ Straight Chain Mixture | 180-200 |

[1] Gum.

The lower polymethylene diamines, i.e., the $C_2$-$C_{12}$, inclusive, methylene diamines are particularly suitable as shown by the following example.

EXAMPLE 11

Hexamethylene diamine was reacted with the cumene-maleic anhydride adduct, i.e., tricyclo-9-i-propyl-decene-9,3,4,7,8 tetracarboxylic acid dianhydride. Equimolar amounts were employed. The diamine was dissolved in N,N-dimethyl acetamide and the dianhydride was then added slowly to the solution. During the addition the solution was efficiently stirred. The solution viscosity increased, and at the completion of the addition, the resulting light brown colored solution was poured into a flat aluminum dish. The solvent was removed by heating the dish and its contents in a vacuum oven at 70° C. and a pressure of 20 mm. of Hg. The temperature was then increased to 140° C. and maintained for about 4 hours. The cured polyimide film (0.12 mm. thick) had a melting point of 450° C.; a molecular weight of about 300,000; a tensile strength of 1083 pounds; and an initial modulus of 20.83×10$^3$ with a 25 percent elongation at the breaking point.

The above example demonstrates that useful substantially linear high melting methylene bridged polyimide polymers can be prepared from the direct reaction of the alkylbenzene-maleic anhydride adducts of the present process with the lower polymethylene diamines. These polymers appear to be readily prepared in the 10$^4$-10$^5$ molecular weight unit range.

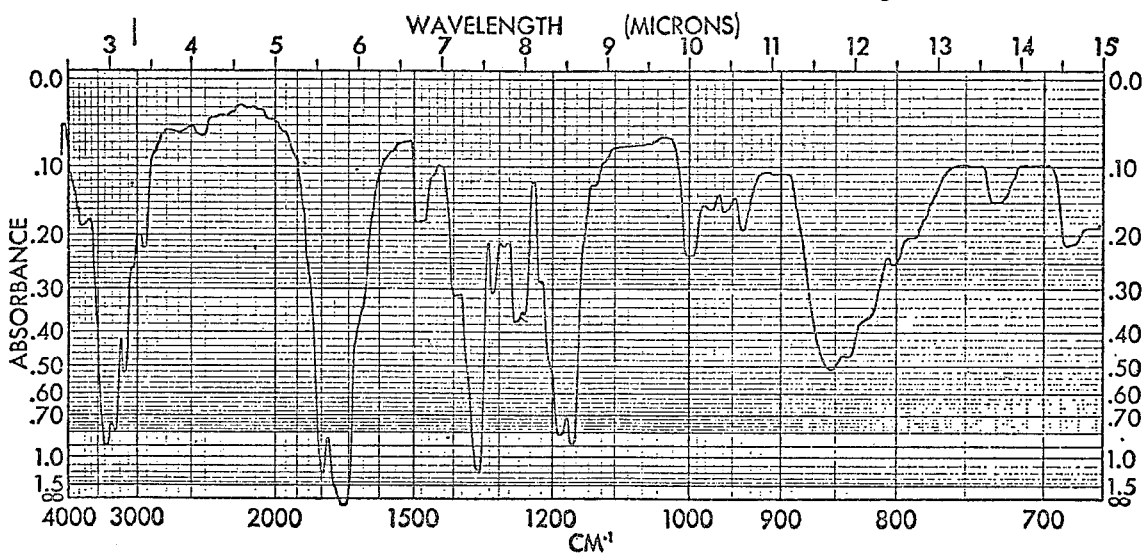

Infrared Spectrum (KBr) of the Cumene-Maleic Anhydride Photoadduct

The high melting tricyclo-decene dianhydrides produced in the present process are useful for the preparation of extremely tough high melting polyimides in their reactions with aryl diamines. These polymers are useful as coating materials and for their heat and radiation resistance.

EXAMPLE 12

To an efficiently stirred mixture of 5 grams (0.025 mol) of 4,4′-diaminodiphenyl ether in 90 g. of N,N-dimethyl acetamide was slowly added 7.6 g. (0.025 mol) of tricyclo - [4.2.0$^{2.5}$]-9-ethyl-dec-9-ene-3,4,7,8 tetracarboxylic acid anhydride. During the addition a noticeable rise in viscosity occurred. The resulting light brown solution was poured into a flat dish and the acetamide removed by evaporation in a vacuum oven maintained at about 70° C. and 20 mm. of Hg pressure. The temperature was then raised and maintained at about 140° C. for 4 hours. The resulting polyimide had a melting point in excess of 600° C., and a molecular weight of about 300,000.

The above examples demonstrate that a dianhydride of the formula

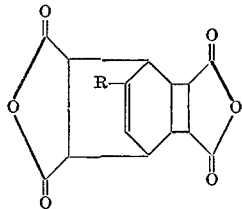

in which R can be hydrogen or an alkyl group having fewer than 5 carbon atoms is useful in its reaction at elevated temperatures and reduced pressures with aryl diamines such as 4,4′-diamino-phenyl ether, p-xylylene diamine, m-xylylene diamine, and 4,4′-diaminodiphenyl for the production of polyimides having a molecular weight of at least about 300,000 units.

As will be evident to those skilled in the art, numerous modifications in this process can be made or followed, having in mind the foregoing disclosure and discussion without departing from the spirit or scope of the disclosure or from the scope of the claims.

I claim:

1. Process for the production of a tricyclo-compound of the formula

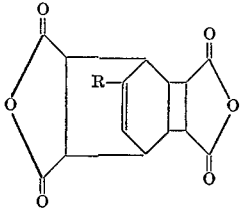

by reacting maleic anhydride and an aryl hydrocarbon of the formula $C_6H_5R$, said R in the above formula being a saturated hydrocarbon radical containing fewer than 21 carbon atoms, consisting essentially of irradiating with actinic light a liquid mixture of maleic anhydride, said aryl hydrocarbon, and a lower dialkyl ketone, wherein the mol ratio of said ketone to maleic anhydride is at least 2 to 1 and the temperature of said mixture is less than the pyrolysis temperature of said reactants.

2. Process of claim 1 wherein said ketone is acetone and said ratio of dialketone to maleic anhydride is in the range 5–20 to 1, respectively.

3. Process of claim 1 wherein said irradiation is by mercury arc lamp or sunlight.

4. The process as in claim 1 wherein said aryl hydrocarbon is ethylbenzene.

5. The process as in claim 1 wherein said aryl hydrocarbon is toluene.

6. The process as in claim 1 wherein said aryl hydrocarbon is cumene.

7. The process as in claim 1 wherein said aryl hydrocarbon is t-butylbenzene.

8. The process as in claim 1 wherein said aryl hydrocarbon is selected from the group consisting of $C_7$–$C_{20}$-monoalkylbenzenes, inclusive.

References Cited

UNITED STATES PATENTS 2,411,983  12/1946  Vaughan et al. _____ 204—163
3,257,418   6/1966  Vermont _____ 204—162

OTHER REFERENCES

Bryce-Smith, Journal Chemical Society (1962), pages 2675–79.

HOWARD S. WILLIAMS, Primary Examiner

U.S. Cl. X.R.

260—346.3